US011858490B2

(12) United States Patent
Uraoka

(10) Patent No.: US 11,858,490 B2
(45) Date of Patent: Jan. 2, 2024

(54) BRAKE CONTROL DEVICE

(71) Applicant: ADVICS CO., LTD., Kariya (JP)

(72) Inventor: Terushige Uraoka, Takahama (JP)

(73) Assignee: ADVICS CO., LTD., Kariya (JP)

( * ) Notice: Subject to any disclaimer, the term of this patent is extended or adjusted under 35 U.S.C. 154(b) by 598 days.

(21) Appl. No.: 15/734,418

(22) PCT Filed: Jun. 27, 2019

(86) PCT No.: PCT/JP2019/025533
§ 371 (c)(1),
(2) Date: Dec. 2, 2020

(87) PCT Pub. No.: WO2020/004525
PCT Pub. Date: Jan. 2, 2020

(65) Prior Publication Data
US 2021/0171003 A1 Jun. 10, 2021

(30) Foreign Application Priority Data
Jun. 29, 2018 (JP) ................... 2018-125039

(51) Int. Cl.
*B60T 8/172* (2006.01)
*B60T 13/68* (2006.01)
*B60T 13/74* (2006.01)

(52) U.S. Cl.
CPC ............ *B60T 8/172* (2013.01); *B60T 13/686* (2013.01); *B60T 13/745* (2013.01); *B60T 2250/04* (2013.01)

(58) Field of Classification Search
None
See application file for complete search history.

(56) References Cited

U.S. PATENT DOCUMENTS 4,143,514 A * 3/1979 Leiber ................... B60T 17/226
60/554
5,522,650 A * 6/1996 Negrin .................... B60T 8/404
303/DIG. 11

(Continued)

FOREIGN PATENT DOCUMENTS

JP 2006306351 A 11/2006
JP 2007509801 A 4/2007

(Continued)

OTHER PUBLICATIONS

International Search Report (PCT/ISA/210) and translation and Written Opinion (PCT/ISA/237) dated Oct. 1, 2019, by the Japanese Patent Office as the International Searching Authority for International Application No. PCT/JP2019/025533.

*Primary Examiner* — Richard M Camby
(74) *Attorney, Agent, or Firm* — BUCHANAN INGERSOLL & ROONEY PC

(57) ABSTRACT

A brake control device according to an embodiment executes, for an electric braking wheel of either the front wheel and the rear wheel, a brake hold control for driving an electric braking device to move a propulsion shaft toward the braked member to be braked and bring it into contact with a piston, calculating a target braking force for maintaining the stationary state of the vehicle, subtracting a first braking force from the target braking force to calculate a required hydraulic braking force applied to the non-electric braking wheel different from the electric braking wheel, and controlling a differential pressure control valve connected to the non-electric braking wheel of the hydraulic braking device so that the required hydraulic braking force is applied to the non-electric braking wheel.

8 Claims, 5 Drawing Sheets

(56) References Cited

U.S. PATENT DOCUMENTS

| | | | | |
|---|---|---|---|---|
| 5,975,655 | A * | 11/1999 | Toda | B60T 8/4291 |
| | | | | 303/119.2 |
| 9,731,722 | B2 * | 8/2017 | Khafagy | B60W 50/14 |
| 10,260,473 | B2 * | 4/2019 | Pedlar | F02N 11/0822 |
| 10,412,456 | B2 * | 9/2019 | Zalewski | A63F 13/63 |
| 2006/0186731 | A1 | 8/2006 | Bach | |
| 2016/0023660 | A1 * | 1/2016 | Yu | B60W 10/184 |
| | | | | 477/203 |
| 2018/0154875 | A1 | 6/2018 | Takahashi et al. | |
| 2019/0023247 | A1 | 1/2019 | Baehrle-Miller et al. | |
| 2019/0176785 | A1 * | 6/2019 | Hansmann | B60T 13/686 |

FOREIGN PATENT DOCUMENTS

| | | |
|---|---|---|
| JP | 2018069879 A | 5/2018 |
| JP | 2018090098 A | 6/2018 |
| WO | 2017/167482 A1 | 10/2017 |

\* cited by examiner

HYDRAULIC BRAKE OPERATION AMOUNT

BH INSTRUCTION

DIFFERENTIAL PRESSURE CONTROL VALVE FRONT WHEEL

DIFFERENTIAL PRESSURE CONTROL VALVE REAR WHEEL

CURRENT VALUE EPB MOTOR WHEEL

BRAKING FORCE FRONT WHEEL

BRAKING FORCE REAR WHEEL

BRAKE CONTROL DEVICE

TECHNICAL FIELD

The present disclosure relates to a brake control device.

BACKGROUND ART

In recent years, in vehicles such as passenger cars, a brake hold function that automatically holds the brake force when the vehicle is stopped by the operation of the brake pedal by the driver has been widely adopted. This brake hold function is particularly convenient when the vehicle is stopped on a slope.

There have been roughly two methods to realize the brake hold function. The first method is a method of energizing the normally open differential pressure control valve in the hydraulic circuit to have it in a closed state when the brake pedal is operated by the driver and hydraulic pressure is applied to the wheels, thus maintaining the hydraulic pressure even after the brake pedal is no longer operated. The second method is a method of calculating and generating the electric brake force required to maintain the stationary state by Electric Parking Brake (EPB) when the brake pedal is operated by the driver and hydraulic pressure is applied to the wheels.

CITATIONS LIST

Patent Literature

Patent Literature 1: Japanese Unexamined Patent Application Publication No. 2006-306351

SUMMARY OF INVENTION

Technical Problems

In the first method, the differential pressure control valve must be continuously energized while the vehicle is maintained in a stationary state. As a result, power consumption is increased. Furthermore, in the second method, the electric brake force to maintain the stationary state is generated independently by the EPB separately from the hydraulic pressure, an extra braking force is generated, and therefore, an extra power consumption is generated.

Therefore, one of the problems of the present disclosure is to provide a brake control device capable of realizing a brake hold function with low power consumption by using the EPB.

Solutions to Problems

A brake control device according to the present disclosure relates to a brake control device applied to a vehicle, the brake control device comprising, a hydraulic braking device that makes a braking member press against a braked member rotating integrally with wheels by using hydraulic pressure so that hydraulic braking force applied to the front and rear wheels of the vehicle is generated, and an electric braking device that makes the braking member press against the braked member by driving a motor so that an electric braking force applied to an electric braking wheel that is either the front wheel and the rear wheel is generated, a control unit that, when execution of a brake hold control for maintaining a stationary state is permitted in a situation where the vehicle is in the stationary state by the hydraulic braking force, executes the brake hold control in which a propulsion shaft moves toward the braked member so that the propulsion shaft contacts with a piston by driving the electric braking device, in which a differential pressure control valve is controlled so that a required hydraulic braking force applies to a non-electric braking wheel, the hydraulic braking device having the differential pressure control valve connected to the non-electric braking wheel different from the electric braking wheel, the required hydraulic braking force calculated by subtracting a first braking force from a target braking force to maintain the stationary state, the first braking force that is the electric braking force applied to the electric braking wheel in the absence of hydraulic pressure after the propulsion shaft contacts with the piston.

DESCRIPTION OF EMBODIMENT

Hereinafter, exemplary embodiments of the present disclosure, which is first embodiment and second embodiment, will be disclosed. The configurations of the embodiment shown below, and the operations and results (effects) provided by the configurations are merely examples. The present disclosure can also be realized with configurations other than the configurations disclosed in the following embodiments. Furthermore, according to the present disclosure, it is possible to obtain at least one of the various effects (including derivative effects) obtained by the following configuration.

First Embodiment

Figure 1:
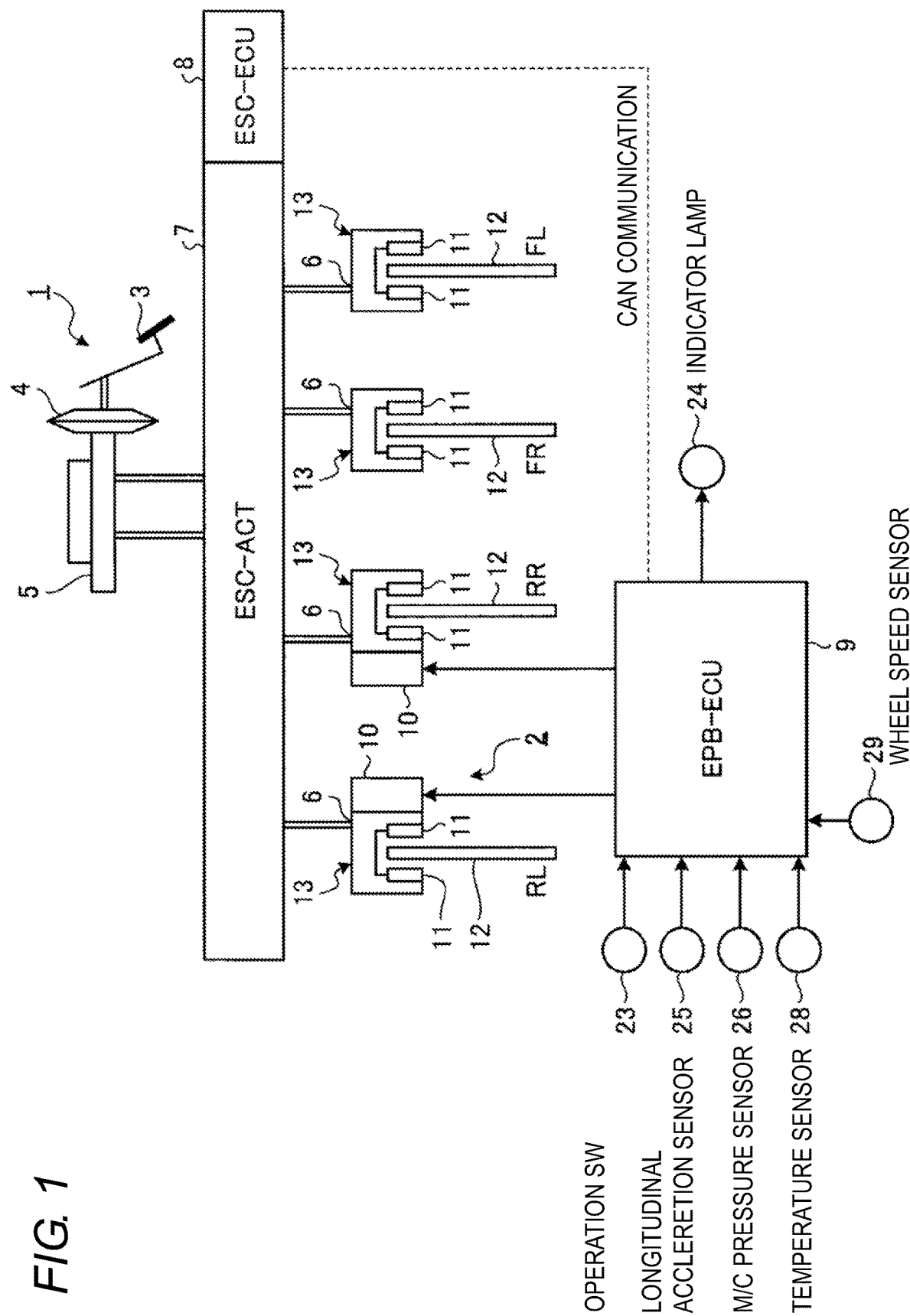
FIG. 1 is a schematic view showing an overall outline of a vehicle braking device according to a first embodiment.
Figure 2:
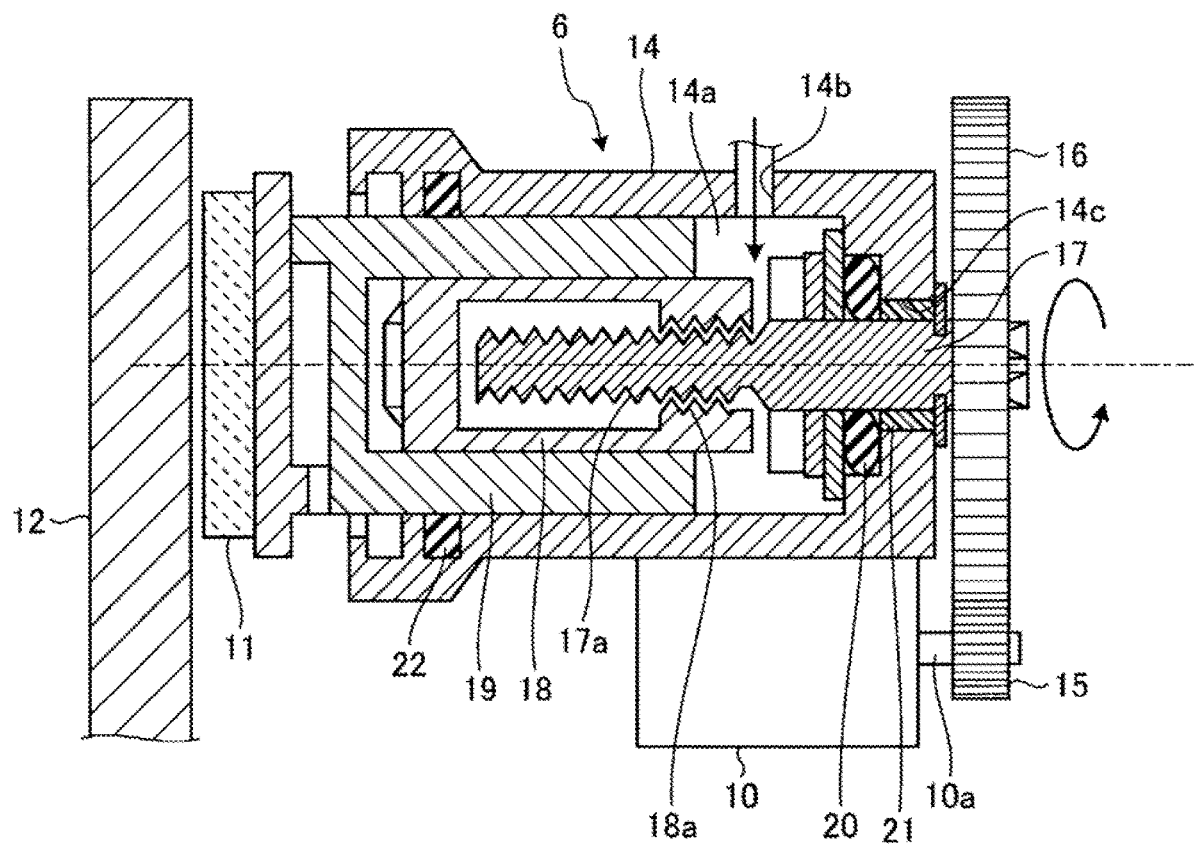
FIG. 2 is a schematic cross-sectional view of a wheel brake mechanism of a rear wheel system provided in the vehicle braking device of the first embodiment.

In a first embodiment, a vehicle braking device in which a disc brake EPB is applied to the rear wheel system will be described in this example. FIG. 1 is a schematic view showing an overall outline of a vehicle braking device of the first embodiment. FIG. 2 is a schematic cross-sectional view of a wheel brake mechanism of the rear wheel system provided in the vehicle braking device of the first embodiment.

As shown in FIG. 1, the vehicle braking device of the first embodiment includes a service brake 1 that generates a service brake force, which is hydraulic braking force, in response to the pedaling force of the driver, and an EPB 2 for regulating the movement of the vehicle when the vehicle is parked or the like.

The service brake 1 is a hydraulic brake mechanism (also referred to as a hydraulic braking device) that generates brake hydraulic pressure based on the driver's depression of the brake pedal 3 and generates service brake force based on this brake hydraulic pressure. Specifically, the service brake 1 boosts the pedaling force corresponding to the depression of the brake pedal 3 by the driver with a booster 4, and then generates a brake hydraulic pressure corresponding to the boosted pedaling force in a master cylinder (hereinafter referred to as M/C) 5. Then, the brake hydraulic pressure is transmitted to a wheel cylinder (hereinafter, referred to as W/C) 6 provided in a wheel brake mechanism of each wheel to generate a service brake force. Furthermore, an actuator 7 for controlling brake hydraulic pressure is provided between the M/C 5 and the W/C 6. The actuator 7 adjusts the service brake force generated by the service brake 1 and performs various controls (e.g., anti-skid control etc.) for improving the safety of the vehicle.

Various controls using the actuator 7 are executed by an electronic stability control—an electric control unit (ESC-ECU) 8 that controls the service brake force. For example, the ESC-ECU 8 outputs a control current for controlling various control valves provided in the actuator 7 and a motor for driving the pump to control the hydraulic circuit provided in the actuator 7, and control the W/C pressure transmitted to the W/C 6. Wheel slip is thereby avoided, for example, and the safety of the vehicle is improved. For example, the actuator 7 is configured to include, for each wheel, a pressure increasing control valve that controls the application of the brake hydraulic pressure generated in the M/C 5 or the brake hydraulic pressure generated by the pump drive with respect to the W/C 6, a pressure decreasing control valve that decreases the W/C pressure by supplying brake fluid in each W/C 6 to a reservoir, and the like, and performs pressure increasing, maintaining, and decreasing control of the W/C pressure. Furthermore, the actuator 7 can realize the automatic pressurizing function of the service brake 1, and based on the control of the pump drive and various control valves, can automatically pressurize the W/C 6 even when there is no brake operation. Details of the hydraulic braking device including the actuator 7 will be described later with reference to FIG. 3.

On the other hand, the EPB 2 generates electric parking brake force (hereinafter, also referred to as "electric braking force" and "electric brake force") by driving the wheel brake mechanism by the EPB motor 10, and is configured to have an EPB-ECU 9 that controls the drive of the EPB motor 10. The EPB-ECU 9 and the ESC-ECU 8 transmit and receive information by, for example, Controller Area Network (CAN) communication.

The wheel brake mechanism is a mechanical structure that generates a brake force in the vehicle braking device of the first embodiment, and has a structure in which a wheel brake mechanism of the front wheel system first generates a service brake force by the operation of the service brake 1. On the other hand, the wheel brake mechanism of the rear wheel system has a common structure that generates a brake force for both the operation of the service brake 1 and the operation of the EPB 2. The wheel brake mechanism of the front wheel system is a wheel brake mechanism that has been conventionally used in general, in which a mechanism for generating the electric brake force based on the operation of the EPB 2 is omitted, as opposed to the wheel brake mechanism of the rear wheel system, and thus the description thereof will be omitted here, and the wheel brake mechanism of the rear wheel system will be described below.

In the wheel brake mechanism of the rear wheel system, not only when the service brake 1 is operated but also when the EPB 2 is operated, the brake pad 11, which is the friction material shown in FIG. 2, is pressed to sandwich the brake disc 12 (12RL, 12RR, 12FR, 12FL) which is a friction object material by the brake pad 11, thus generating a friction force between the brake pad 11 and the brake disc 12, and generating a brake force.

Specifically, the wheel brake mechanism rotates the EPB motor 10 directly fixed to the body 14 of the W/C 6 for pressing the brake pad 11 as shown in FIG. 2 in the caliper 13 shown in FIG. 1 to rotate the spur gear 15 provided on a drive shaft 10a of the EPB motor 10. Then, the brake pad 11 is moved by transmitting the rotational force (output) of the EPB motor 10 to a spur gear 16 engaged with the spur gear 15, and the electric brake force by the EPB 2 is generated.

In the caliper 13, in addition to the W/C 6 and the brake pad 11, a part of the end face of the brake disc 12 is housed so as to be sandwiched by the brake pad 11. The W/C 6 can generate the W/C pressure in a hollow portion 14a, which is the brake fluid storage chamber, by introducing the brake hydraulic pressure into the hollow portion 14a of the cylindrical body 14 through a passage 14b, and is configured to include a rotary shaft 17, a propulsion shaft 18, a piston 19, and the like in the hollow portion 14a.

The rotary shaft 17 has one end connected to the spur gear 16 through an insertion hole 14c formed in the body 14, so that when the spur gear 16 is rotated, the rotary shaft 17 is rotated with the rotation of the spur gear 16. A male screw groove 17a is formed on the outer peripheral surface of the rotary shaft 17 at the end of the rotary shaft 17 opposite to the end connected to the spur gear 16. On the other hand, the other end of the rotary shaft 17 is axially supported by being inserted into the insertion hole 14c. Specifically, the insertion hole 14c is provided with a bearing 21 together with an O-ring 20, so that the O-ring 20 prevents the brake fluid from leaking out between the rotary shaft 17 and the inner wall surface of the insertion hole 14c, and the bearing 21 axially supports the other end of the rotary shaft 17.

The propulsion shaft 18 is configured by a nut including a hollow tubular member, and has a female screw groove 18a to be screw fitted with the male screw groove 17a of the rotary shaft 17 formed on the inner wall surface. The propulsion shaft 18 is configured, for example, in a circular column shape or a polygonal column shape provided with a key for preventing rotation, so that even if the rotary shaft 17 is rotated, it cannot be rotated about the rotation center of the rotary shaft 17. Therefore, when the rotary shaft 17 is rotated, the rotational force of the rotary shaft 17 is converted to a force for moving the propulsion shaft 18 in the axial direction of the rotary shaft 17 by the engagement between the male screw groove 17a and the female screw groove 18a. When the drive of the EPB motor 10 is stopped, the propulsion shaft 18 stops at the same position due to the frictional force from the engagement between the male screw groove 17a and the female screw groove 18a, where if the drive of the EPB motor 10 is stopped when the target electric brake force is obtained, the propulsion shaft 18 can be held at that position, desired electric brake force can be maintained and self-locking (hereinafter simply referred to as "lock") can be performed.

The piston 19 is arranged so as to surround the outer periphery of the propulsion shaft 18, and is formed by a bottomed cylindrical member or a polygonal cylindrical member and arranged such that the outer peripheral surface comes into contact with the inner wall surface of the hollow portion 14a formed in the body 14. A structure is such that a seal member 22 is provided on the inner wall surface of the body 14 and W/C pressure can be applied to the end face of the piston 19 so that brake fluid does not leak out between the outer peripheral surface of the piston 19 and the inner wall surface of the body 14. The seal member 22 is used to generate a reaction force for returning the piston 19 at the time of release control after the lock control. Since the seal member 22 is provided, basically, even if the brake pad 11 and the piston 19 are pushed in within a range not exceeding the elastic deformation amount of the seal member 22 by the tilted brake disc 12 during turning, they are pushed back toward the brake disc 12 so that the gap between the brake disc 12 and the brake pad 11 is held at a predetermined clearance.

In addition, to prevent the piston 19 from rotating about the rotation center of the rotary shaft 17 even if the rotary shaft 17 rotates, when the propulsion shaft 18 is provided with a rotation prevention key, the piston is provided with a key groove in which the key slides, and when the propulsion shaft 18 has a polygonal column shape, the piston has a polygonal cylindrical shape corresponding thereto.

The brake pad 11 is arranged at the distal end of the piston 19, and the brake pad 11 is moved in the left-right direction in the plane of drawing accompanying the movement of the piston 19. Specifically, the piston 19 is movable in the left direction in the plane of drawing accompanying the movement of the propulsion shaft 18, and is movable in the left direction in the plane of drawing independently from the propulsion shaft 18 when the W/C pressure is applied to the end of the piston 19 (the end opposite to the end where the brake pad 11 is arranged). Then, if the brake hydraulic pressure in the hollow portion 14a is not applied (W/C pressure=0) when the propulsion shaft 18 is at the release position (the state before the EPB motor 10 is rotated), which is the standby position in the normal release, the piston 19 is moved in the right direction in the plane of drawing by the elastic force of the seal member 22 to be described later, and the brake pad 11 can be separated away from the brake disc 12. Furthermore, when the EPB motor 10 is rotated and the propulsion shaft 18 is moved in the left direction in the plane of drawing from the initial position, even if the W/C pressure becomes 0, the movement of the piston 19 in the right direction in the plane of drawing is regulated by the moved propulsion shaft 18 and the brake pad 11 is held in place.

In the wheel brake mechanism configured as described above, when the service brake 1 is operated, the piston 19 is moved in the left direction in the plane of drawing based on the W/C pressure generated thereby so that the brake pad 11 is pressed against the brake disc 12 and the service brake force is generated. Furthermore, when the EPB 2 is operated, the spur gear 15 is rotated by driving the EPB motor 10, and the spur gear 16 and the rotary shaft 17 are accordingly rotated, so that the propulsion shaft 18 is moved toward the brake disc 12 (left direction in the plane of drawing) based on the engagement between the male screw groove 17a and the female screw groove 18a. The distal end of the propulsion shaft 18 thereby comes into contact with the bottom surface of the piston 19 and presses the piston 19, whereby the piston 19 is also moved in the same direction, so that the brake pad 11 is pressed against the brake disc 12 and an electric brake force is generated. Therefore, a shared wheel brake mechanism that generates a brake force for both the operation of the service brake 1 and the operation of the EPB 2 can be adopted.

Furthermore, it is possible to confirm the generation state of the electric braking force by the EPB2 or recognize the current detection value by confirming the current detection value of the current sensor (not shown) for detecting the current through the EPB motor 10.

A longitudinal acceleration sensor 25 detects acceleration in the longitudinal direction (traveling direction) of the vehicle and inputs a detection signal to the EPB-ECU 9.

An M/C pressure sensor 26 detects the M/C pressure in the M/C 5 and inputs a detection signal to the EPB-ECU 9.

A temperature sensor 28 detects the temperature of the wheel brake mechanism (e.g., a brake disc) and inputs a detection signal to the EPB-ECU 9.

A wheel speed sensor 29 detects the rotation speed of each wheel and inputs a detection signal to the EPB-ECU 9. Although the wheel speed sensor 29 is actually provided one for each wheel, detailed illustration and description thereof will be omitted here.

The EPB-ECU 9 is configured by a well-known microcomputer equipped with Central Processing Unit (CPU), Read Only Memory (ROM), Random Access Memory (RAM), I/O, and the like, and performs parking brake control by controlling the rotation of the EPB motor 10 following the program stored in the ROM and the like.

The EPB-ECU 9 inputs, for example, a signal corresponding to the operation state of an operation switch (SW) 23 provided on an instrumental panel (not shown) in the vehicle compartment, and drives the EPB motor 10 according to the operation state of the operation SW 23. Furthermore, the EPB-ECU 9 executes lock control, release control, and the like based on the current detection value of the EPB motor 10, and recognizes that the lock control is being performed based on the control state or that the wheel is in the lock state by the lock control, and that the release control is being performed or that the wheel is in the release state. or EPB release state, by the release control. Then, the EPB-ECU 9 outputs a signal for performing various displays to an indicator lamp 24 provided on the instrumental panel.

The vehicle braking device configured as described above basically performs an operation of generating a braking force in the vehicle by generating the service brake force by the service brake 1 when the vehicle is traveling. Moreover, when the vehicle is stopped by the service brake 1, the driver performs operations such as pressing the operation SW 23 to operate the EPB 2 and generate the electric brake force thus maintaining the stationary state, and then releasing the electric brake force thereafter. That is, as the operation of the service brake 1, when the driver operates the brake pedal 3 while the vehicle is traveling, the brake hydraulic pressure generated in the M/C 5 is transmitted to the W/C 6 thus generating the service brake force. Moreover, as the operation of the EPB 2, the piston 19 is moved by driving the EPB motor 10, and the electric brake force is generated by pressing the brake pad 11 against the brake disc 12 to have the wheels in the lock state, or the electric brake force is released by separating the brake pad 11 from the brake disc 12 to have the wheels in the release state.

Specifically, the electric brake force is generated or released by the lock/release control. In the lock control, the EPB 2 is operated by forward rotating the EPB motor 10, the rotation of the EPB motor 10 is stopped at a position where a desired electric brake force can be generated by the EPB 2, and this state is maintained. A desired electric brake force is thereby generated. In the release control, the EPB 2 is operated by reverse rotating the EPB motor 10, and the electric brake force generated in the EPB 2 is released.

Figure 3:
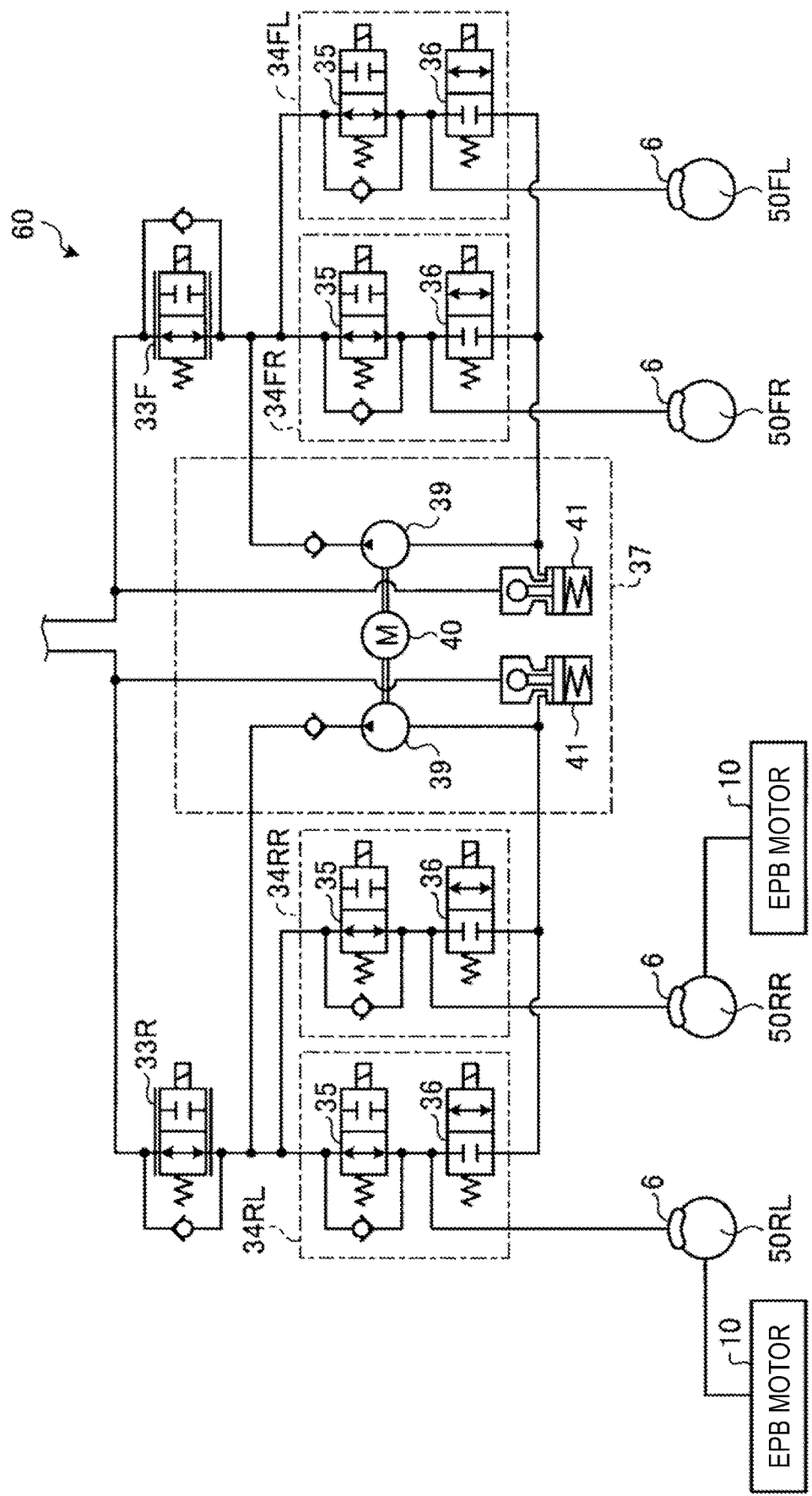
FIG. 3 is a configuration diagram showing a schematic configuration of a hydraulic braking device and an electric braking device according to the first embodiment.

FIG. 3 is a configuration diagram showing a schematic configuration of the hydraulic braking device and the electric braking device according to the first embodiment. As illustrated in FIG. 3, the vehicle braking device according to the first embodiment includes a hydraulic braking device 60 configured to be able to apply a braking force (friction braking torque) to four wheels 50RL, 50RR, 50FR, and 50FL, and an EPB 2 (FIG. 1) including the EPB motor 10 configured to be able to apply a braking force to two wheels 50RL and 50RR.

The hydraulic braking device 60 includes four wheel cylinders 6, pressure adjusting units 34RL, 34RR, 34FR and 34FL, and a reflux mechanism 37. Each of the four wheel cylinders 6 is a mechanism that pressurizes the brake pads (FIG. 1) to apply braking force to the wheels 50RL, 50RR, 50FR, and 50FL. The pressure adjusting units 34RL, 34RR, 34FR and 34FL are mechanisms for adjusting the hydraulic pressure applied to the corresponding wheel cylinder 6, respectively. The reflux mechanism 37 is a mechanism that returns the fluid (working fluid) serving as a medium for generating the hydraulic pressure toward the upstream side. The differential pressure control valves 33R and 33F open and close under the control of the ESC-ECU 8 (see FIG. 1).

The pressure adjusting units 34RL, 34RR, 34FR, and 34FL each includes electromagnetic valves 35 and 36 capable of electrically switching between the open state and the closed state. The electromagnetic valves 35 and 36 are provided between the differential pressure control valve 33 and a reservoir 41. The electromagnetic valve 35 is connected to the differential pressure control valves 33R, 33F, and the electromagnetic valve 36 is connected to the reservoir 41.

The electromagnetic valves 35 and 36 open and close under the control of the ESC-ECU 8 to increase, maintain, or decrease the pressure generated by the wheel cylinder 6.

The reflux mechanism 37 includes the reservoir 41 and a pump 39, and a pump motor 40 that rotates the front-side and rear-side pumps 39 to transport the fluid toward the upstream side. One of each of the reservoir 41 and the pump 39 is provided in correspondence with the combination of the pressure adjusting units 34RL and 34RR and the combination of the pressure adjusting units 34FR and 34FL.

Here, in the first embodiment, the EPB motor 10 driven under the control of the EPB-ECU 9 (FIG. 2) is connected to each of the two wheel cylinders 6 on the rear side. Thus, in the first embodiment, the brake pads 11 (FIG. 2) of the two wheel cylinders 6 on the rear side are pressurized in response to the drive of the EPB motor 10, so that the electric braking force is applied to the wheels 50RL and 50RR on the rear side. Therefore, in the first embodiment, the two wheel cylinders 6 on the rear side and the two EPB motors 10 connected to these two wheel cylinders 6 function as EPB 2 capable of generating a parking braking force separate from the hydraulic braking force by the hydraulic braking device 60.

Here, the details of the control of the ESC-ECU 8 and the EPB-ECU 9 will be described. The ESC-ECU 8 and the EPB-ECU 9 are applied to a vehicle including a hydraulic braking device that presses the brake pad 11 (braking member) with hydraulic pressure toward the brake disc 12 (member to be braked) that rotates integrally with the wheels and generates a hydraulic braking force, for the front and rear wheels of the vehicle, and an electric braking device that presses the brake pad 11 by driving the EPB motor 10 toward the brake disc 12 and generates an electric braking force, for an electric braking wheel of either the front wheel and the rear wheel.

Then, when the execution of the brake hold control for maintaining a stationary state is permitted in a situation where the vehicle is maintained in the stationary state by the hydraulic braking force generated by the hydraulic braking device 60, the ESC-ECU 8 and the EPB-ECU 9 execute the following brake hold control.

The EPB-ECU 9 drives the EPB2 to move the propulsion shaft 18 toward the brake disc 12 and bring it into contact with the piston 19 of the rear wheels, which is electric braking wheels, and calculates a target braking force for maintaining the stationary state of the vehicle. In addition, the EPB-ECU 9 calculates a required hydraulic braking force applied to the front wheels, which is non-electric braking wheels, by subtracting a value of a first braking force that is the electric braking force is generated by the EPB2 in the absence the hydraulic braking force after the propulsion shaft 18 contacts with the piston 19 from the target braking force. The ESC-ECU 8 controls the differential pressure control valve 33F (FIG. 3) in the hydraulic braking device 60 connected to the front wheels to generate the required hydraulic braking force.

Furthermore, when a value of the required hydraulic braking force obtained by subtracting the first braking force in the absence the hydraulic braking force after the propulsion shaft 18 contacts with the piston 19 from the target braking force is less than or equal to zero, the ESC-ECU 8 controls the differential pressure control valve 33F in the hydraulic braking device 60 connected to the front wheels so that no hydraulic braking force is generated on the front wheels.

Moreover, when the hydraulic braking force generated by the hydraulic brake operation increases during the execution of the brake hold control, the ESC-ECU 8 and the EPB-ECU 9 again execute the brake hold control from the beginning.

Next, with reference to FIG. 4, the state of operation of each configuration when the brake hold function is executed in the first embodiment will be described. FIG. 4 is a timing chart showing the state of operation of each configuration when the brake hold function is executed by the vehicle braking device of the first embodiment. In FIGS. 4A to 4G, the horizontal axis represents time. In FIG. 4(*a*), the vertical axis represents the hydraulic brake operation amount (the amount of depression of the brake pedal 3). In FIG. 4(*b*), the vertical axis represents the presence/absence (ON/OFF) of the brake hold (BH) instruction (BH start operation by the operation SW 23). In FIG. 4C, the vertical axis represents the energized state (energized/de-energized) of the differential pressure control valve 33F connected to the front wheels. In FIG. 4D, the vertical axis represents the energized state (energized/de-energized) of the differential pressure control valve 33R connected to the rear wheels. In FIG. 4E, the vertical axis represents the current value (current detection value) through the EPB motor 10. In FIG. 4F, the vertical axis represents the braking force applied to the front wheels. In FIG. 4G, the vertical axis represents the braking force applied to the rear wheels.

Figure 4A:
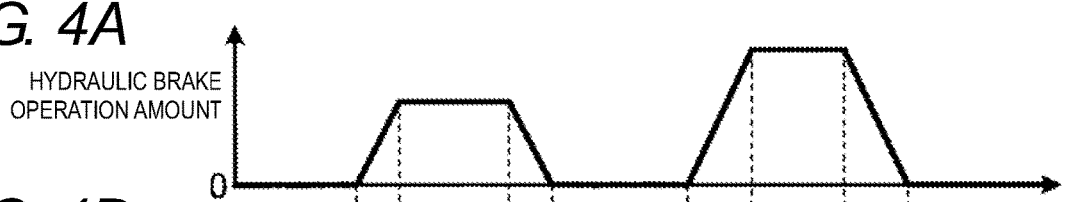
FIGS. 4A-4G are a timing chart showing the state of operation of each configuration when the brake hold function is executed in the vehicle braking device of the first embodiment.
Figure 4B:
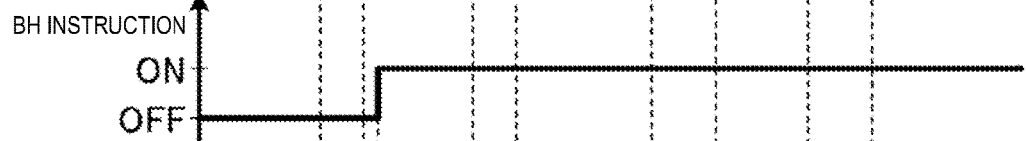
Figure 4C:
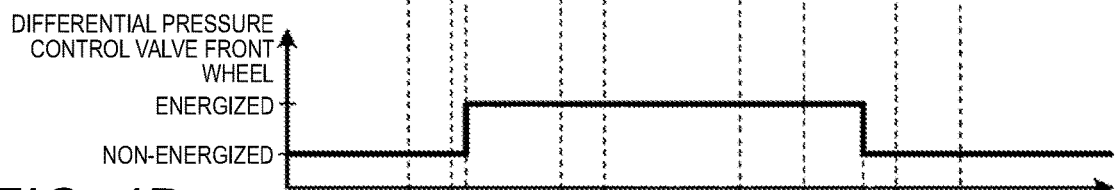
Figure 4D:
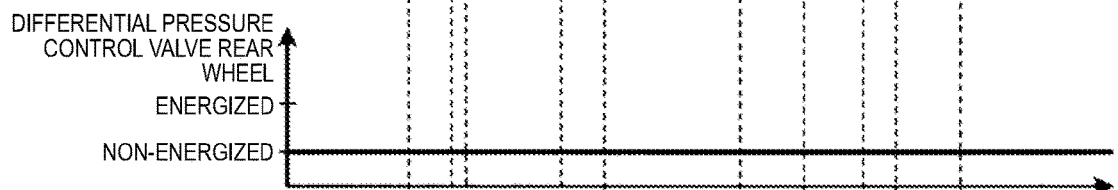
Figure 4E:
Figure 4F:
Figure 4G:
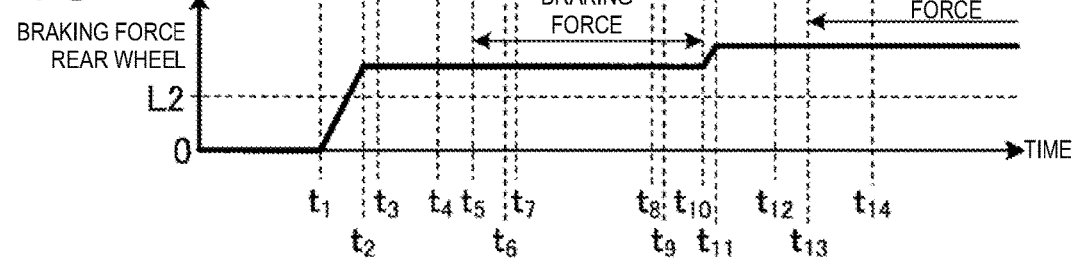

It is assumed that while the vehicle is in the stationary state, as shown in FIG. 4A, the driver performs the first hydraulic brake operation from time t1 to time t7, and then performs the second hydraulic brake operation stronger than the first time from time t8 to time t14. Furthermore, as shown in FIG. 4B, it is assumed that the driver gives a BH instruction (BH start operation by the operation SW 23) at time t3, and then the ON state of the BH instruction continues.

In that case, the EPB-ECU 9 drives the EPB2 to operate the EPB motor 10 to move the propulsion shaft 18 (FIG. 2) toward the brake disc 12 and bring it into contact with the piston 19 provided with the rear wheels (time t3 to t4 in FIG. 4E). Thus, for the rear wheels, even if the hydraulic pressure applied to the rear wheels decreases thereafter (after time t5 in FIG. 4 A), an electric braking force substantially the same as the hydraulic braking force up to that point can be generated (FIG. 4G).

Next, the EPB-ECU 9 calculates the target braking force for maintaining the stationary state of the vehicle. For example, the target braking force is determined by using the road gradient calculated from the detection values of the longitudinal acceleration sensors. In addition, the EPB-ECU 9 calculates the required hydraulic braking force applied to the front wheels by subtracting the first braking force that is the electric braking force is generated by EPB2 in the absence the hydraulic braking force after the propulsion shaft 18 contacts with the piston 19 from the target braking force.

Then, the ESC-ECU 8 controls the differential pressure control valve 33F (FIG. 3) in the hydraulic braking device connected to the front wheels 60 so that the required hydraulic braking force is applied to the front wheels. Thus, even if the hydraulic brake operation amount starts to decrease from time t5 and becomes zero at t7 (FIG. 4A), the braking force applied to the front wheels starts to decrease from time t5 and becomes the required hydraulic braking force at time t6, and thereafter, maintains the required hydraulic braking force (FIG. 4F).

Moreover, when the driver performs the second hydraulic brake operation stronger than the first time from time t8 to time t14 during the execution of the brake hold control, the ESC-ECU 8 and the EPB-ECU 9 again execute the brake hold control from the beginning. That is, the EPB-ECU 9 first drives the EPB2 to operate the EPB motor 10 to move the propulsion shaft 18 (FIG. 2) toward the brake disc 12 and bring it into contact with the piston 19 for the rear wheels (time t11 to t12 in FIG. 4E). Thus, for the rear wheels, even if the hydraulic pressure applied to the rear wheels decreases thereafter (after time t13 in FIG. 4 A), an electric braking force substantially the same as the hydraulic braking force up to that point can be generated (FIG. 4G). That is, the electric braking force after time t13 can be made larger than the electric braking force from time t5 to time t10 (FIG. 4G).

In addition, the EPB-ECU 9 calculates the required hydraulic braking force applied to the front wheels by subtracting the first braking force generated by EPB2 in the absence of hydraulic pressure after the propulsion shaft 18 contacts with the piston 19 from the target braking force. At this time, when the calculated required hydraulic braking force is less than or equal to zero, the ESC-ECU 8 controls the differential pressure control valve 33F in the hydraulic braking device 60 connected to the front wheels so that no hydraulic braking force is applied to the front wheels. As a result, as shown in FIG. 4F, the braking force applied to the front wheels starts to decrease from time t13 and becomes zero at time t14. However, after time t14, even if the braking force applied to the front wheels is zero (FIG. 4F), the braking force applied to the rear wheels is large (FIG. 4G), and the braking force for maintaining the stationary state is secured for the vehicle as a whole.

Figure 5:
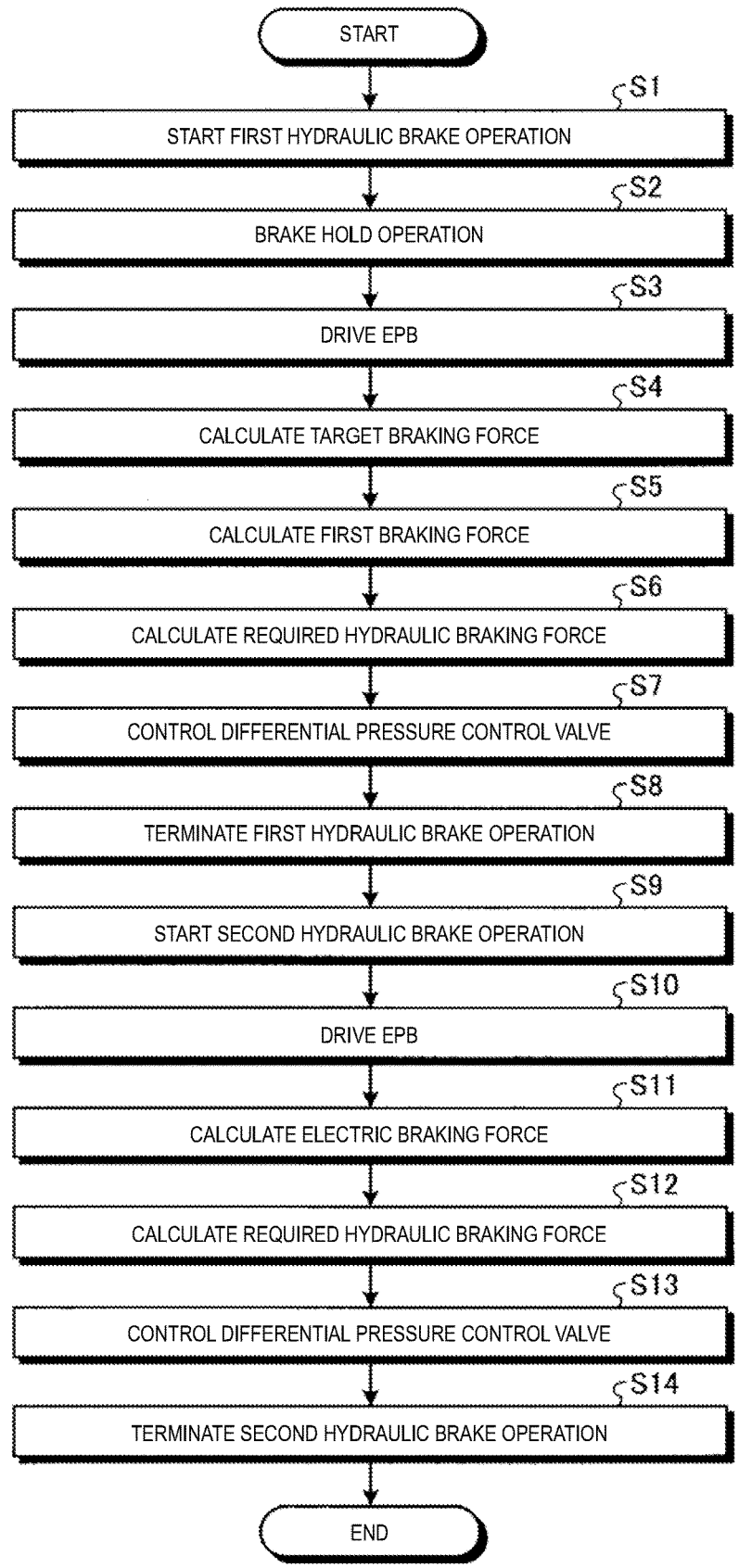
FIG. 5 is a flowchart showing a process executed by the brake control device of the first embodiment.

Next, the process executed by the brake control device will be described with reference to FIG. 5. FIG. 5 is a flowchart showing a process executed by the brake control device of the first embodiment.

First, the driver starts the first hydraulic brake operation (step S1 in FIG. 5: time t1 in FIG. 4A).

Next, when the operation unit (operation SW 23) is operated by the driver to instruct the execution of the brake hold function (step S2 in FIG. 5: time t3 in FIG. 4B), the EPB-ECU 9 drives the EPB2 to operate the EPB motor 10 to move the propulsion shaft 18 toward the brake disc 12 and bring it into contact with the piston 19 connected to the rear wheels (step S3 in FIG. 5: time t3 to t4 in FIG. 4E).

Next, the EPB-ECU 9 calculates the target braking force for maintaining the stationary state of the vehicle (step S4 in FIG. 5). Next, the EPB-ECU 9 calculates the first braking force generated by the EPB2 in the absence of hydraulic pressure (step S5 in FIG. 5). For example, the first braking force is the same as the hydraulic braking force after the propulsion shaft 18 contacts with the piston 19.

Next, the EPB-ECU 9 calculates the required hydraulic braking force by subtracting the electric braking force calculated in step S5 from the target braking force calculated in step S4 (step S6 in FIG. 5). Next, the ESC-ECU 8 controls the differential pressure control valve 33F (FIG. 3) in the hydraulic braking device 60 connected the front wheels so that the required hydraulic braking force calculated in step S6 is applied to the front wheels (step S7 in FIG. 5).

Next, the driver terminates the first hydraulic brake operation (step S8 in FIG. 5: time t7 in FIG. 4A). According to the above control, as shown in FIG. 4G, the braking force applied to the rear wheels is maintained even after time t5 when the driver starts to loosen the hydraulic brake operation. Furthermore, as shown in FIG. 4F, the braking force applied to the front wheels is maintained by the required hydraulic braking force from time t6 to time t9.

The driver then initiates a second hydraulic brake operation (step S9 in FIG. 5: time t9 in FIG. 4A).

Next, when the hydraulic brake operation amount reaches its peak (time t11 in FIG. 4A), the EPB-ECU 9 drives the EPB2 to operate EPB motor 10 to move the propulsion shaft 18 toward the brake disc 12 and bring it into contact with the piston 19 for the rear wheels (step S10 in FIG. 5: time t11 to t12 in FIG. 4E).

Next, the EPB-ECU 9 calculates the first braking force that is the electric braking force, which can be identical with the original hydraulic braking force, generated by the EPB2 in the absence of hydraulic pressure (step S11 in FIG. 5).

Next, the EPB-ECU 9 calculates the required hydraulic braking force applied to the front wheels by subtracting the first braking force calculated in step S11 from the target braking force calculated in step S4 (step S12 in FIG. 5). Next, the ESC-ECU 8 controls the differential pressure control valve 33F (FIG. 3) in the hydraulic braking device 60 connected to the front wheels so that the required hydraulic braking force calculated in step S12 is applied to the front wheels (step S13 in FIG. 5).

Next, the driver terminates the second hydraulic brake operation (step S14 in FIG. 5: time t14 in FIG. 4A). According to the above control, as shown in FIG. 4G, the braking force applied to the rear wheels is maintained even after time t13 when the driver starts to loosen the hydraulic brake operation. Furthermore, as shown in FIG. 4F, the braking force applied to the front wheels becomes zero after time t14.

As described above, according to the brake control device of the first embodiment, the brake hold function can be realized with low power consumption by using the EPB2. That is, for example, as shown in FIG. 4C, the differential pressure control valve 33F connected to the front wheels can be energized from time t3 to time t12. On the other hand, in the first method of the prior art described above, the differential pressure control valve connected to the front wheels had to be energized while the BH instruction is ON (FIG. 4B), resulting in large power consumption.

Furthermore, as shown in FIG. 4D, it is not necessary to energize the differential pressure control valve 33R connected to the rear wheels. On the other hand, in the first method, the differential pressure control valve connected to the rear wheels had to be energized while the BH instruction was ON (FIG. 4B), resulting in large power consumption.

L2 shown in FIG. 4G is a target value of the braking force applied to the rear wheels in the first method. According to the brake control device of the first embodiment, the braking force applied to the rear wheels larger than L2 can be maintained even after the time t5 when the driver starts to loosen the hydraulic brake operation by simply driving the EPB motor 10 from time t3 to time t4, and thus it is efficient. Furthermore, larger braking force applied to the rear wheels can be maintained even after the time t13 when the driver starts to loosen the hydraulic brake operation by simply driving the EPB motor 10 from time t11 to time t12, and thus it is efficient.

L1 shown in FIG. 4F is a target value of the braking force applied to the front wheels in the first method. According to the brake control device of the first embodiment, the braking force applied to the rear wheels can be maintained larger than L2 from time t6 to time t9 (FIG. 4G), and hence the braking force applied to the front wheels (FIG. 4F) can be made smaller than L1, whereby power consumption can be reduced accordingly.

Furthermore, in the second method of the prior art described above, there is a problem that since the electric brake force required to maintain the stationary state is calculated and generated independently by the EPB separately from the hydraulic pressure, an extra braking force is generated, and therefore, an extra power consumption is generated. However, according to the brake control device of the first embodiment, when the brake hold function is executed, the hydraulic braking force applied to the front wheels is reduced by the amount of the large electric braking force applied to the rear wheels, so that such extra braking force and power consumption are not generated.

Furthermore, in the prior art, there is a method of holding the hydraulic braking force for a predetermined time and then switching to the electric braking force when executing the brake hold function, but the differential pressure control valve needs to be continuously energized during a predetermined time for holding the hydraulic braking force, resulting in large power consumption. On the other hand, according to the brake control device of the first embodiment, when executing the brake hold function, the differential pressure control valve connected to the rear wheels does not need to be energized at all, and the differential pressure control valve connected to the front wheels also does not need to be energized after time t12 in the example of FIG. 4, and thus the power consumption can be prevented small.

Moreover, in the first method, even if the differential pressure control valve is continuously energized in order to maintain the stationary state, due to structural reasons, the fluid gradually may pass through the differential pressure control valve, and as the hydraulic pressure gradually decreases, the braking force decreases, and it may not be possible to maintain the stationary state for a long time. On the other hand, according to the brake control device of the first embodiment, since such a decrease does not occur with the electric braking force by the EPB2, the stationary state can be maintained even for a long time.

Second Embodiment

Next, a brake control device of the second embodiment will be described. The description on the matters same as in the first embodiment will be omitted as appropriate.

In the brake control device of the second embodiment, when the service brake 1 fails during the execution of the brake hold control, the EPB-ECU 9 controls the EPB2 so that the electric braking force becomes the target braking force for the rear wheels.

Thus, even when the service brake 1 fails, stable braking control can be realized by controlling the EPB2 so that the electric braking force becomes the target braking force.

The embodiment and modified examples of the present disclosure have been described above, but the above-described embodiments and modified examples are merely examples, and they are not intended to limit the scope of the disclosure. The novel embodiments and modified examples described above can be implemented in various forms, and various omissions, substitutions, or modifications can be made without departing from the gist of the disclosure. Furthermore, the embodiments and modified examples described above are included in the scope and gist of the disclosure, and are included in the disclosure described in the Claims and the equivalent scope thereof.

For example, in the embodiments described above, the rear wheels are electric braking wheels, but this is not the sole case, and the front wheels may be electric braking wheels.

Moreover, the hydraulic circuit is a so-called front-rear piping as shown in FIG. 3 (piping configuration in which the output from the M/C 5 is divided into two systems, two front wheels and two rear wheels), but this is not the sole case, and the hydraulic circuit may be a so-called X piping (piping configuration in which the output from the M/C 5 is divided into two systems of front and rear wheels on a diagonal line). When the X piping is adopted, both of the two differential pressure control valves need to be energized when executing the brake hold function, but similar to the example of FIG. 4 where the differential pressure control valve of the front wheels is de-energized after time t12, the two differential pressure control valves can also be de-energized from the middle of the execution of the brake hold function, and hence the power consumption can be suppressed to be small.

The present disclosure can also be applied at the time of execution of the brake hold function in an autonomous vehicle.

Furthermore, in the embodiments described above, a mode in which the presence/absence of the instruction of the brake hold control is switched by the driver operating the operation unit is shown. Instead, the brake hold control may be executed when the control unit determines that the brake hold control is necessary regardless of the driver's intention or operation.

Furthermore, in the embodiments described above, a mode in which the electric braking device is operated to execute the brake hold control in a situation where the hydraulic braking force is generated by operating the brake pedal is shown. Instead, the brake hold control may be executed in a situation where the hydraulic braking force is automatically generated by the control unit when the brake pedal is not operated.

The invention claimed is:

1. A brake control device applied to a vehicle, the brake control device comprising:
   a hydraulic braking device that makes a braking member press against a braked member rotating integrally with wheels by using hydraulic pressure so that hydraulic braking force applied to the front and rear wheels of the vehicle is generated;
   an electric braking device that makes the braking member press against the braked member by driving a motor so that an electric braking force applied to an electric braking wheel that is either the front wheel and the rear wheel is generated; and a control unit that, when execution of a brake hold control for maintaining a stationary state is permitted in a situation where the vehicle is in the stationary state by the hydraulic braking force, executes the brake hold control in which a propulsion shaft moves toward the braked member so that the propulsion shaft contacts with a piston by driving the electric braking device, in which a differential pressure control valve is controlled so that a required hydraulic braking force applies to a non-electric braking wheel, the hydraulic braking device having the differential pressure control valve connected to the non-electric braking wheel different from the electric braking wheel, the required hydraulic braking force calculated by subtracting a first braking force from a target braking force to maintain the stationary state, the first braking force is the electric braking force applied to the electric braking wheel in the absence of hydraulic pressure after the propulsion shaft contacts with the piston.

2. The brake control device according to claim 1, wherein if the required braking force is less than or equal to zero, the control unit controls the differential pressure control valve so that no hydraulic braking force is applied to the non-electric braking wheel.

3. The brake control device according to claim 1, wherein when the hydraulic braking force increases during the execution of the brake hold control, the control unit executes the brake hold control once again.

4. The brake control device according to claim 1, wherein when the hydraulic braking device fails during the execution of the brake hold control, the control unit controls the electric braking device so that the target braking force is applied to the electric braking wheel.

5. The brake control device according to claim 2, wherein when the hydraulic braking force increases during the execution of the brake hold control, the control unit executes the brake hold control once again.

6. The brake control device according to claim 2, wherein when the hydraulic braking device fails during the execution of the brake hold control, the control unit controls the electric braking device so that the target braking force is applied to the electric braking wheel.

7. The brake control device according to claim 3, wherein when the hydraulic braking device fails during the execution of the brake hold control, the control unit controls the electric braking device so that the target braking force is applied to the electric braking wheel.

8. The brake control device according to claim 1, wherein the first braking force is identical with the hydraulic braking force when the propulsion shaft contacts with the piston in the stationary state.

* * * * *